(12) United States Patent
Christensen

(10) Patent No.: US 7,882,345 B1
(45) Date of Patent: Feb. 1, 2011

(54) SYSTEM, METHOD, AND APPARATUS FOR PROCESSOR DETECTION IN A PRE-BOOT EXECUTION ENVIRONMENT

(75) Inventor: Michael J. Christensen, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 682 days.

(21) Appl. No.: 11/864,993

(22) Filed: Sep. 29, 2007

Related U.S. Application Data

(60) Provisional application No. 60/994,389, filed on Sep. 19, 2007.

(51) Int. Cl.
*G06F 15/177* (2006.01)

(52) U.S. Cl. .............................. 713/2; 713/1; 709/217; 709/220

(58) Field of Classification Search ..................... 713/1, 713/2; 709/217, 220
See application file for complete search history.

(56) References Cited

U.S. PATENT DOCUMENTS

| | | | | |
|---|---|---|---|---|
| 5,933,631 | A * | 8/1999 | Mealey et al. .................. 713/2 |
| 6,601,166 | B1 * | 7/2003 | Ayyar et al. .................... 713/2 |
| 6,807,558 | B1 * | 10/2004 | Hassett et al. ............... 709/203 |
| 6,816,964 | B1 * | 11/2004 | Suzuki et al. .................. 713/2 |
| 7,251,725 | B2 * | 7/2007 | Loison et al. .................. 713/1 |
| 7,305,561 | B2 * | 12/2007 | Hunt et al. .................. 713/182 |
| 7,330,118 | B2 * | 2/2008 | Durham et al. .......... 340/572.1 |
| 7,467,295 | B2 * | 12/2008 | Erickson et al. ................ 713/2 |
| 2002/0120721 | A1 * | 8/2002 | Eilers et al. .................. 709/220 |
| 2002/0198972 | A1 * | 12/2002 | Babbitt et al. ............... 709/222 |
| 2003/0005096 | A1 * | 1/2003 | Paul et al. .................... 709/222 |
| 2003/0131152 | A1 * | 7/2003 | Erlingsson .................. 709/328 |
| 2004/0081104 | A1 * | 4/2004 | Pan et al. ..................... 370/254 |
| 2005/0180326 | A1 * | 8/2005 | Goldflam et al. ............ 370/231 |
| 2006/0143432 | A1 * | 6/2006 | Rothman et al. ............... 713/2 |
| 2007/0157016 | A1 * | 7/2007 | Dayan et al. ................... 713/2 |
| 2007/0198819 | A1 * | 8/2007 | Dickens et al. ................. 713/1 |
| 2008/0046708 | A1 * | 2/2008 | Fitzgerald et al. .............. 713/2 |

\* cited by examiner

*Primary Examiner*—Thomas Lee
*Assistant Examiner*—Zahid Choudhury
(74) *Attorney, Agent, or Firm*—Advantedge Law Group

(57) ABSTRACT

The disclosure is directed to systems and methods for processor detection in a pre-boot execution environment. In one example, a client initiates a boot process by transmitting a pre-boot image request identifying the client's processor architecture. A boot server replies to the request and transmits a non-booting image configured to precisely determine the processor installed on the client. The non-booting image then initiates a second pre-boot image request including the precise identification of the processor installed on the client. The boot server may then proceed with the boot process, transmitting subsequent boot code precisely configured for the installed processor.

15 Claims, 5 Drawing Sheets

SYSTEM, METHOD, AND APPARATUS FOR PROCESSOR DETECTION IN A PRE-BOOT EXECUTION ENVIRONMENT

BACKGROUND INFORMATION

Network booting is a process of booting a client computer from a network rather than a local drive. One such system is the Preboot Execution Environment ("PXE") which is an environment to boot computers using a network interface card independently of available data storage devices, such as hard disks, or installed operating systems. Before deploying an image across the network from a server to a client it is important to know the client architecture as the image is based upon the client architecture.

The PXE specification version 2.1 (Sep. 20, 1999) only has a limited number of processor types that can be detected at the client and returned to the server. With the PXE 2.1 specification the following processors are detectable:

| | |
|---|---|
| 1. IA x86 PC | return value = 0 |
| 2. NEC/PC98 | return value = 1 |
| 3. IA64 | return value = 2 |
| 4. DEC Alpha | return value = 3 |
| 5. ArcX86 | return value = 4 |
| 6. Intel Lean Client | return value = 5 |

Additionally, the PXE specification is no longer an active specification and has not been modified to reflect any of the new x86 64 bit processor types.

This creates difficulties in determining the correct processor type. For example, the new Intel 64 bit and the AMD 64 bit architectures which are the most common desktop and laptop processor types currently being sold are not on the list of detectable processors. Under PXE, the x86 processor architectures currently provided by original equipment manufacturers (OEM) will return x86 32 bit type of processor even though the real processor may be 64 bit.

One method to obtain the processor type information is by using the resident firmware code within the BIOS or EFI code on the PXE booting client. Modification to the BIOS or EFI firmware would need to be made to retrieve the processor type in the same way that PXE documentation specifies. The list of detected processor types could be modified by adding the 64 bit processor types to such list as industry standard identifiers. However, this requires a hardware change.

BRIEF SUMMARY

The disclosure is directed to systems, apparatus, and methods for processor detection in a pre-boot execution environment.

It should be appreciated that the examples disclosed herein can be implemented in numerous ways, including as one or more processes, apparatuses, systems, devices, methods, computer readable media, or computer program products embodied on computer readable media.

In one example, a client initiates a boot process by transmitting a pre-boot image request identifying the client's processor architecture. A boot server replies to the request and transmits a non-booting image configured to precisely determine the processor installed on the client. The non-booting image then initiates a second pre-boot image request including the precise identification of the processor installed on the client. The boot server may then proceed with the boot process, transmitting subsequent boot code precisely configured for the installed processor. Additional details and exemplary embodiments are disclosed below.

BRIEF DESCRIPTION OF THE DRAWINGS

Various embodiments are described with reference to the accompanying drawings, wherein like reference numbers designate like elements, and in which.

DETAILED DESCRIPTION

Figure 1:
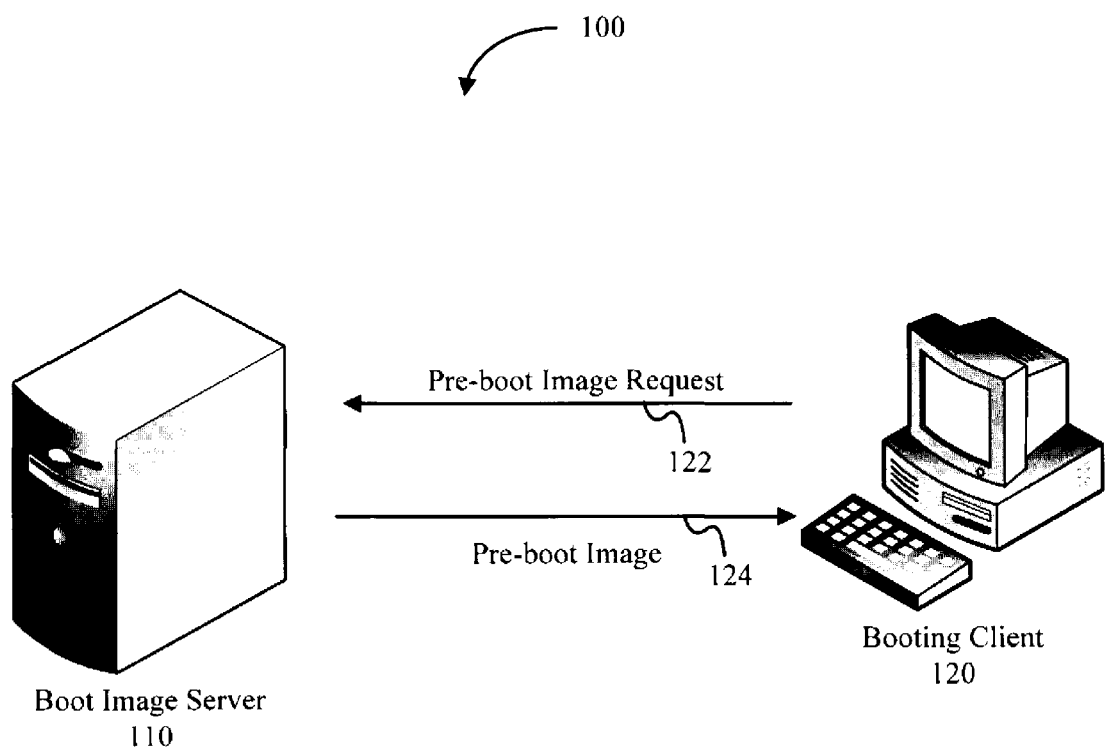
FIG. 1 illustrates an exemplary prior art computing system configured for processor detection in a pre-boot execution environment.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

General Concepts

Exemplary systems and methods for processor detection in a pre-boot execution environment are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

Processor detection systems, apparatus, and methods disclosed herein can detect processor types in a pre-boot execution environment, without requiring firmware changes. For example, new x86 64 bit processor types can be detected in a PXE booting client without changes to the client's firmware.

Prior Art System

Turning now to the drawings, FIG. 1 illustrates a prior art computing system 100 (or simply "the system 100") configured for processor detection in a pre-boot execution environment. As shown, the computing system 100 includes a boot image server 110 and a booting client 120. The prior art computing system 100 facilitates detecting certain processor types in a pre-boot execution environment for the purpose of selecting a boot image to be downloaded to the booting client 120.

The boot image server 110 may include one or more devices configured to communicate with a booting client 120 over a network. The booting client 120 initiates the remote boot process by requesting 122 a pre-boot code image from the boot image server 110. The request includes the processor type installed in the booting client 120. The boot image server 110 then responds with the correct pre-boot image 124 for that processor type.

In certain embodiments, for example, the boot image server 110 may comprise a PXE server which may include or be embodied on one or more servers such as a server running Altiris® Deployment Solution™ software provided by Altiris, Inc., a division of Symantec Corporation. The boot image server 110 may include and may be configured to execute computer readable instructions embodied on one or more computer readable media, the computer readable instructions being configured for transmitting code to and receiving requests from a booting client 120, which may be embodied as a PXE client.

The PXE specification describes how a PXE client will boot. Each action is defined as a layer. Each of these layers has a number associated with the action being accomplished. The first layer is referred to as layer 0. Layer 0 is the first image or piece of code downloaded to the PXE client. This layer as well as each other layer control the start of the next layer that needs to be used in conjunction with the network bootstrap process ("NBP"). This process auto adjusts the layer number to the next layer and continues until the PXE client has completed the boot sequence.

The PXE standard, however, does not readily integrate new processor types or architectures. Boot code is typically implemented in firmware, so development of new processors was to be matched with updates to boot firmware. In practice, firmware updates have not kept pace with the development of new processors.

Exemplary Systems

Figure 2:
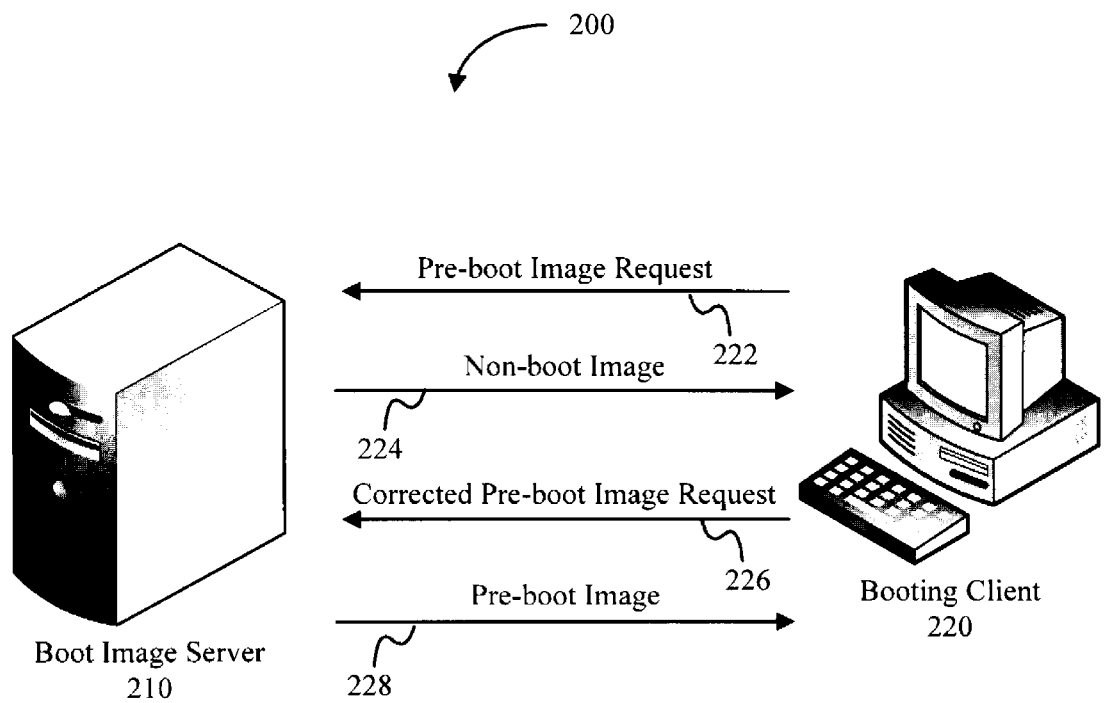
FIG. 2 illustrates components of an exemplary computing system configured for processor detection in a pre-boot execution environment in accordance with the present invention.

FIG. 2 illustrates components of an exemplary computing system 200 configured for processor detection in a pre-boot execution environment in accordance with the present invention. As depicted, the computing system 200 includes a boot image server 210 and a booting client 220. The computing system 200 facilitates detecting processor types in a pre-boot execution environment for the purpose of selecting a boot image to be downloaded to the booting client. A broader range of processor types may be detected by the computing system 200 than detected by the prior art computing system 100. Additionally, the computing system 200 can be reconfigured to detect new processor types without the need to modify firmware.

In certain embodiments, the exemplary computing system 200 may include any computer hardware and/or instructions (e.g., software programs), or combinations of software and hardware, configured to perform the processes described herein. In particular, it should be understood that system 200 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary computing system 200 is shown in FIG. 2, the exemplary components illustrated in FIG. 2 are not intended to be limiting. Indeed, additional or alternative components, implementations, or computing systems may be used to implement the principles and processes described herein.

The booting client 220 initiates the remote boot process by requesting 222 a pre-boot code image from the boot image server 210. The request includes the processor type installed in the booting client 220. However, because the firmware in the booting client 220 may not have been updated to properly identify the processor, the booting client may request a pre-boot image that does not take advantage of all the features of the processor. For example, a pre-boot image for a 32-bit processor may be requested for a 64-bit processor.

The boot image server 210 responds to the request by transmitting 224 a non-boot image that correctly identifies the processor type installed in the booting client 220. The non-boot image then initiates 226 a request for the correct pre-boot image for that processor type to the boot image server 210. Finally, the boot image server 210 transmits 228 the correct pre-boot image for the processor installed in the booting client 220.

Exemplary Apparatus

Figure 3:
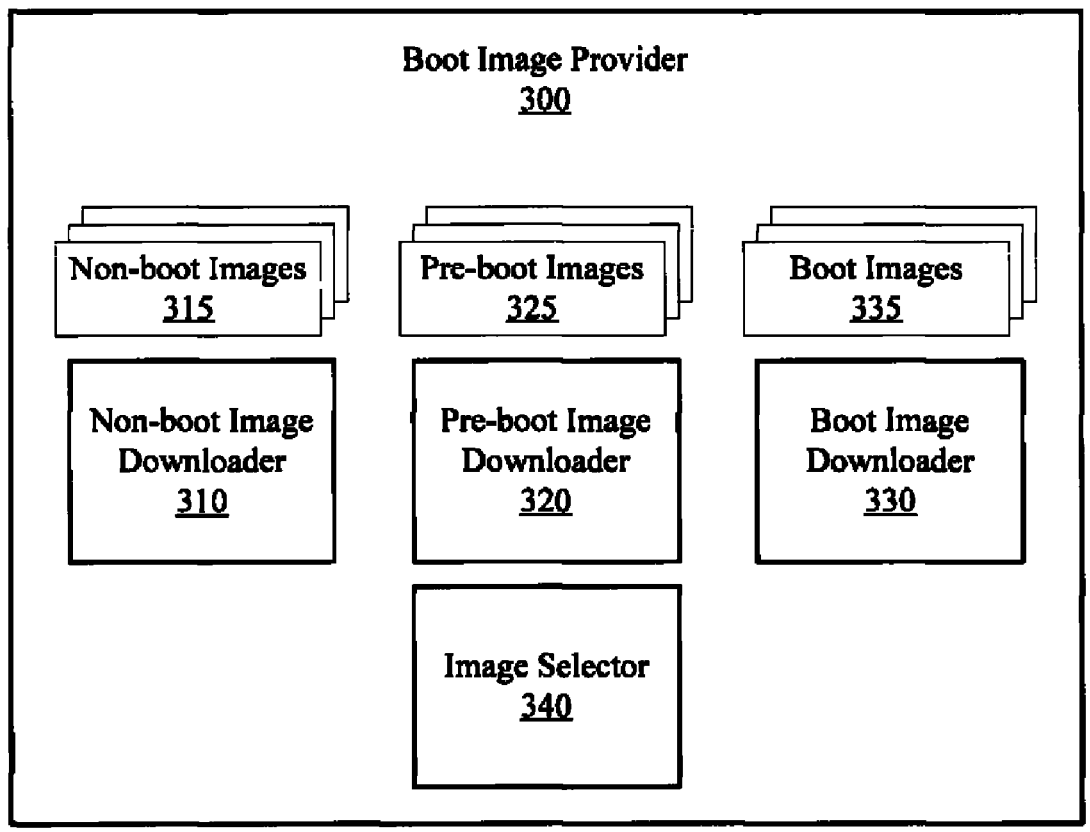
FIG. 3 illustrates components of an exemplary boot image provider apparatus in accordance with the present invention.

FIG. 3 illustrates exemplary components of a boot image provider 300. As shown, the boot image provider includes a non-boot image downloader 310, non-boot code images 315, a pre-boot image downloader 320, pre-boot code images 325, a boot image downloader 330, boot images 335, and an image selector 340. The boot image provider 300 facilitates selection and delivery of the correct boot image components for booting clients such as the booting client 220 depicted in FIG. 2. The boot image provider 300 is one example of a component that may be included in the boot image server 210 shown in FIG. 2.

The non-boot image downloader 310 receives the request for a pre-boot image from the booting client 220. In one embodiment, the pre-boot image request is transmitted as a PXE client option in a Dynamic Host Control Protocol (DHCP) packet. The non-boot image downloader 310 submits the processor type indicated in the pre-boot image request to the image selector 340 to determine which of the non-boot code images 315 is appropriate for the processor type. The non-boot image downloader then transmits the selected non-boot code image 315 to the booting client 220. In some instances, the indicated processor type may correctly and uniquely identify the processor, and the image selector 340 may indicate that the non-boot image downloader 310 may then forward the pre-boot image request to the boot image downloader 330.

The pre-boot image downloader 320 receives the request for a pre-boot image 325 from the non-boot image 315 executing on the booting client 220. The pre-boot image downloader 320 submits the processor type indicated in the pre-boot image request to the image selector 340 to determine which of the pre-boot code images 325 is appropriate for the indicated processor type. The pre-boot image downloader 320 then transmits the selected pre-boot code image 325 to the booting client 220.

The boot image downloader 330 receives the request for a boot image 335 from the pre-boot image 325 executing on the booting client 220. The boot image downloader 330 submits the processor type indicated in the pre-boot image request to the image selector 340 to determine which of the boot images 335 is appropriate for the indicated processor type. The boot image downloader 330 then transmits the selected boot code image 335 to the booting client 220.

Exemplary Methods

Figure 4:
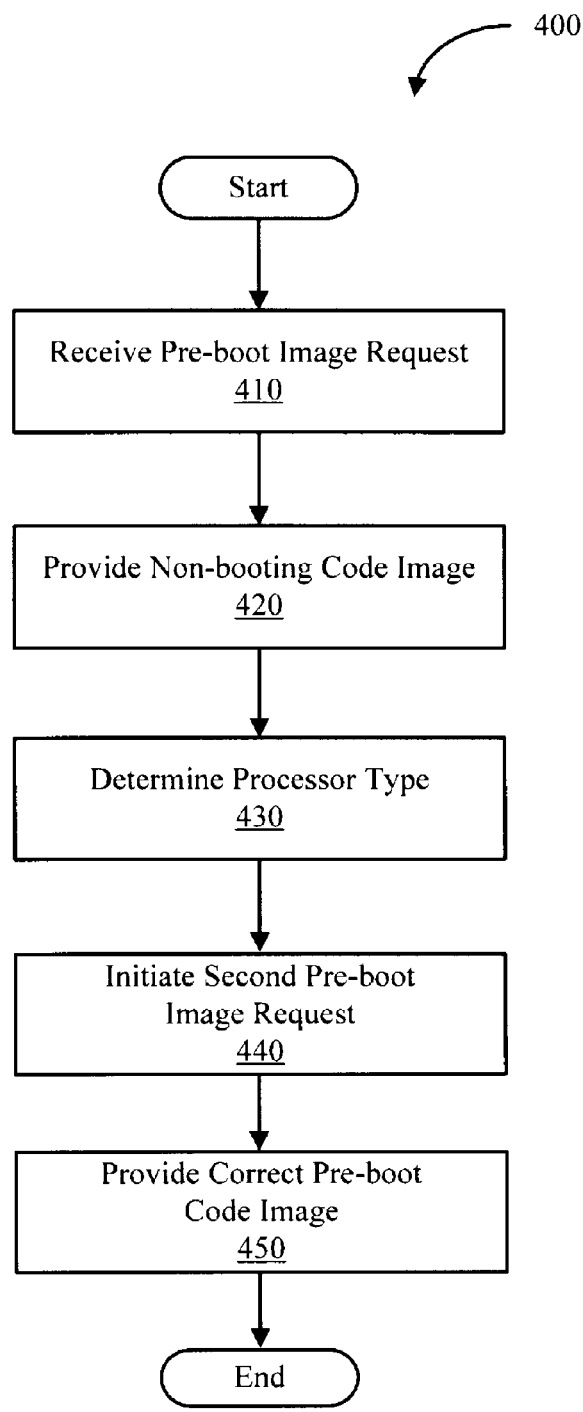
FIG. 4 illustrates components of an exemplary processor detection method in accordance with the present invention.

FIG. 4 illustrates an exemplary processor detection method 400. The processor detection method 400 includes a resolve pre-boot image request operation 410, a provide non-boot code image operation 420, a determine processor type operation 430, an initiate second pre-boot image request operation 440, and a provide correct pre-boot code image operation 450. While FIG. 4 illustrates exemplary acts according to one embodiment, other embodiments may omit, add to, reorder, and/or modify any of the acts shown in FIG. 4.

The receive pre-boot image request operation 410 receives a pre-boot image request from the booting client 220. The pre-boot image request includes a specification from the booting client 220 of the processor type installed. In one embodiment, the pre-boot image request is transmitted as a PXE client option in a Dynamic Host Control Protocol (DHCP) packet. Because the processor type may originate from firmware that has not been updated to correctly identify the processor installed, the assumption is that the processor type identified may not be correct.

The provide non-boot code image operation 420 provides a non-boot code image to the booting client 220. In one embodiment the non-boot code image operation 420 selects one of a number of non-boot code image to be transmitted to the booting client 220, based on the processor type reported in the pre-boot image request received in the receive pre-boot image request operation 410. For example, separate non-boot code images could exist for 32-bit and 64-bit processors in a manufacturer's processor series. In various embodiments, the non-boot code image is transmitted using standard protocols, such as Trivial File Transfer Protocol (TFTP).

The determine processor type operation 430 determines the processor type actually installed in the booting client 220. The non-boot code image transmitted to the booting client 220 by the provide non-boot code image operation 420, executing on the booting client 220, is configured to correctly identify various processors that may be incorrectly identified by firmware in the booting client 220.

The initiate second pre-boot image request operation 440 transmits a second pre-boot image request to be transmitted from the booting client 220 to the boot image server 210. This second pre-boot image request correctly identifies the processor installed in the booting client 220.

The provide correct pre-boot code image operation 450 selects the correct pre-boot code image for the processor type reported by the initiate second pre-boot image request operation 440 and transmits the image to the booting client 220. The booting client 220 can then proceed with a boot operation specifically configured for the processor type installed in the booting client 220. When the provide correct pre-boot code image operation 450 is completed, the determine processor type method 400 ends.

Figure 5:
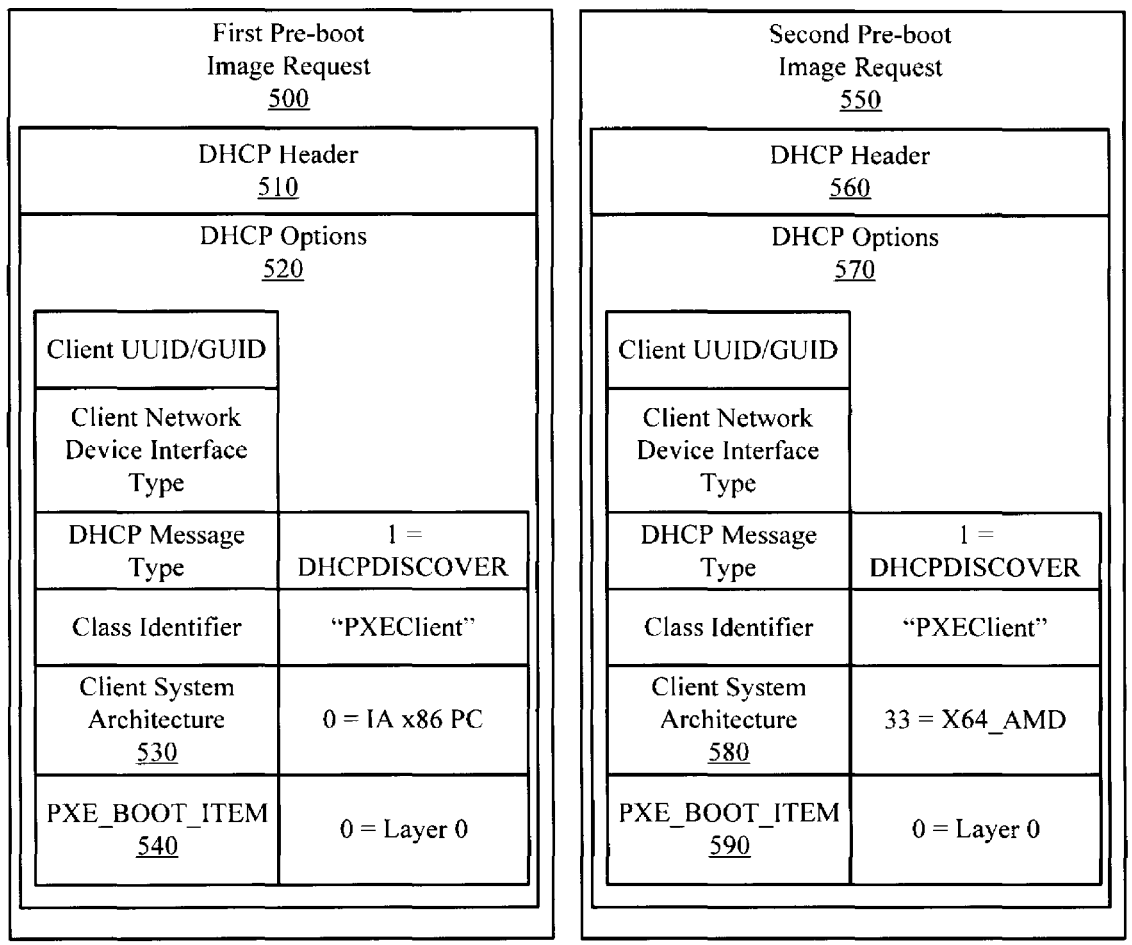
FIG. 5 illustrates components of exemplary processor detection data structures, with sample data.

FIG. 5 illustrates components of exemplary processor detection data structures, a first pre-boot image request 500 and a second pre-boot image request 550, with sample data. The first pre-boot image request 500 includes a DHCP header 510, DHCP options 520, a client system architecture option 530, and a PXE_BOOT_ITEM field 540. The second pre-boot image request 550 includes a DHCP header 560, DHCP options 570, a client system architecture option 580, and a PXE_BOOT_ITEM field 590. The first pre-boot image request 500 and second pre-boot image request 550 illustrate one embodiment of the present invention complying with the PXE specification.

The first pre-boot image request 500 is transmitted by the booting client 220 to initiate the boot process. As depicted in FIG. 5, the first pre-boot image request 500 includes standard components of a PXE pre-boot image request, including the DHCP header 510 and DHCP options 520. The client system architecture option 530 identifies the processor installed in the booting client 220 as "IA x86 PC." The PXE_BOOT_ITEM field 540 is set to a value of zero to indicate a request for a pre-boot image, or "Layer 0" as it is referred to in the PXE specification.

The second pre-boot image request 550 contains the same standard components of a PXE pre-boot image request as the first pre-boot image request 500. In the depicted example, however, the client system architecture option 580 correctly identifies the processor installed in the booting client 220 as "X64_AMD," a new 64-bit processor not recognized by the PXE specification. The PXE_BOOT_ITEM field is set to zero, indicating that the remote boot process is to be re-initiated with the processor type correctly identified in the pre-boot image request.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A system for booting a client, the system comprising:
a client configured to initiate a pre-boot image request in response to a boot command, the pre-boot image request comprising a data field for communicating a processor architecture for the client;
a boot server configured to provide a non-booting image in response to a first pre-boot image request from the client, the first pre-boot image request comprising an architecture identifier that may be imprecise;
the non-booting image configured to query the client and determine a precise processor architecture for the client;
the non-booting image further configured to reset a boot process for the client and thereby initiate a second pre-boot image request from the client wherein the second pre-boot image request comprises an architecture identifier that is precise;
the boot server further configured to provide a pre-boot image to the client that corresponds to the architecture identifier that is precise in response to the second pre-boot image request; and
the boot server further configured to provide a boot image to the client that corresponds to the architecture identifier that is precise in response to a boot image request comprising the architecture identifier that is precise.

2. The system of claim 1, wherein the pre-boot image request is made in compliance with the PXE boot protocol.

3. The system of claim 1, wherein resetting the boot process comprises setting a PXE boot item field to zero.

4. The system of claim 1, wherein the architecture identifier that is precise identifies a 64 bit processor.

5. The system of claim 1, wherein the architecture identifier that may be imprecise identifies a 32 bit processor.

6. The system of claim 1, wherein the boot server supports the DHCP protocol.

7. The system of claim 1, wherein the preboot image is a level 0 PXE image.

8. A method for booting a client, the method comprising:
   receiving, from a client, a first pre-boot image request in response to a boot command, the first pre-boot image request comprising a data field for communicating a processor architecture for the client, the first pre-boot image request comprising an architecture identifier that may be imprecise;
   providing a non-booting image to the client in response to the first pre-boot image request, wherein:
      the non-booting image is configured to query the client and determine a precise processor architecture for the client,
      the non-booting image is further configured to reset a boot process for the client and thereby initiate a second pre-boot image request from the client, the second pre-boot image request comprising an architecture identifier that is precise;
   providing a pre-boot image to the client in response to the second pre-boot image request, the pre-boot image corresponding to the architecture identifier that is precise in response to the second pre-boot image request;
   providing a boot image to the client in response to a boot image request, the boot image corresponding to the architecture identifier that is precise in response to the second pre-boot image request.

9. The method of claim 8, wherein the architecture identifier that may be imprecise identifies a 32 bit processor.

10. The method of claim 8, wherein the architecture identifier that is precise identifies a 64 bit processor.

11. The method of claim 8, wherein the pre-boot image request is made in compliance with the PXE boot protocol.

12. The method of claim 8, wherein the preboot image is a level 0 PXE image.

13. An apparatus for booting a client, the apparatus comprising:
   a non-booting image download module configured to:
      receive, from a client, a first pre-boot image request in response to a boot command, the first pre-boot image request comprising a data field for communicating a processor architecture for the client, the first pre-boot image request comprising an architecture identifier that may be imprecise;
      provide a non-booting image to the client in response to the first pre-boot image request, wherein:
         the non-booting image is configured to query the client and determine a precise processor architecture for the client,
         the non-booting image is further configured to reset a boot process for the client and thereby initiate a second pre-boot image request from the client, the second pre-boot image request comprising an architecture identifier that is precise;
   a pre-boot image download module configured to provide a pre-boot image to a client;
   a boot image download module configured to provide a boot image to a client;
   an image selection module configured to:
      activate the pre-boot image download module in response to the second pre-boot image request from the client,
      activate the boot image download module in response to a boot image request from the client.

14. The apparatus of claim 13, wherein the non-booting image download module is further configured to support the DHCP protocol.

15. The apparatus of claim 13, wherein the precise processor architecture is a 64 bit architecture.

\* \* \* \* \*